United States Patent
Hoffman

(10) Patent No.: US 7,410,262 B2
(45) Date of Patent: Aug. 12, 2008

(54) SYSTEM AND METHOD FOR COMPENSATING FOR SPOKE LIGHT

(75) Inventor: Brent Hoffman, Mooresville, IN (US)

(73) Assignee: TTE Technology, Inc., Indianapolis, IN (US)

( * ) Notice: Subject to any disclaimer, the term of this patent is extended or adjusted under 35 U.S.C. 154(b) by 318 days.

(21) Appl. No.: 11/195,879

(22) Filed: Aug. 2, 2005

(65) Prior Publication Data

US 2007/0035703 A1    Feb. 15, 2007

(51) Int. Cl.
  *G03B 21/14*   (2006.01)
  *G02B 5/22*    (2006.01)

(52) U.S. Cl. .................. 353/84; 353/121; 348/743; 359/891

(58) Field of Classification Search ............ 353/84, 353/85, 69, 121, 122, 94; 348/742, 743, 348/771; 359/889, 891, 892
See application file for complete search history.

(56) References Cited

U.S. PATENT DOCUMENTS

| | | | |
|---|---|---|---|
| 6,285,491 B1 * | 9/2001 | Marshall et al. ............ 359/292 |
| 6,398,389 B1 * | 6/2002 | Bohler et al. ............... 362/293 |
| 6,535,187 B1 * | 3/2003 | Wood .......................... 345/84 |
| 6,567,134 B1 | 5/2003 | Morgan | |
| 6,624,756 B1 | 9/2003 | Butterworth | |
| 2002/0140910 A1 * | 10/2002 | Stark et al. .................... 353/84 |
| 2003/0098835 A1 | 5/2003 | O'Donnell et al. | |
| 2005/0017938 A1 | 1/2005 | O'Donnell et al. | |
| 2005/0046759 A1 | 3/2005 | O'Donnell et al. | |
| 2006/0192734 A1 * | 8/2006 | Willis .......................... 345/84 |
| 2006/0192924 A1 * | 8/2006 | Seki et al. ..................... 353/85 |
| 2006/0221026 A1 * | 10/2006 | Roth et al. .................... 345/88 |

* cited by examiner

*Primary Examiner*—Andrew T Sever
(74) *Attorney, Agent, or Firm*—Fletcher Yoder

(57) ABSTRACT

The disclosed embodiments relate to a system and method for compensating for spoke light in a video unit (10). More specifically, there is provided a method comprising measuring a first light level during a non-spoke time of a color wheel (14) to generate a non-spoke light level; and setting a spoke light compensation value based on the measured non-spoke light level. There is also provided a video unit (10) comprising a light source (12) configured to generate a first light level during a non-spoke time of a color wheel (14), a photodiode assembly (26) configured to measure the first light level to generate a non-spoke light level, and a processor (20) configured to set a spoke light compensation value based on the non-spoke light level.

20 Claims, 4 Drawing Sheets

SYSTEM AND METHOD FOR COMPENSATING FOR SPOKE LIGHT

FIELD OF THE INVENTION

The present invention relates generally to projecting video images onto a screen. More specifically, the present invention relates to a spoke light recovery techniques in a video projection unit.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Digital Light Processing ("DLP") is a display technology that employs an optical semiconductor, known as a Digital Micromirror Device ("DMD") to project video onto a screen. DMDs typically contain an array of at least one million or more microscopic mirrors mounted on microscopic hinges. Each of these mirrors is associated with a point on the screen, known as a pixel. By varying the amount of light that is reflected off each of these mirrors, it is possible to project video onto the screen. Specifically, by electrically actuating each of these hinge-mounted microscopic mirrors, it is possible to either illuminate a point on the screen (i.e., "turn on" a particular micromirror) or to leave that particular point dark by reflecting the light somewhere else besides the screen (i.e., "turn off" the micromirror). Further, by varying the amount of time a particular micromirror is turned on, it is possible to create a variety of gray shades. For example, if a micromirror is turned on for longer than it is turned off, the pixel that is associated with that particular micromirror will have a light gray color; whereas if a particular micromirror is turned off more frequently than it is turned on, that particular pixel will have a darker gray color. In this manner, video can be created by turning each micromirror on or off several thousand times per second. Moreover, by sequentially shining red, green, and blue at the micromirrors instead of white light, it is possible to generate millions of shades or color instead of shades of gray.

As stated above, the shading of a particular pixel may be partially determined by the length of time that the micromirror corresponding to that pixel is either turned on or turned off. This shading can be quantified using a measurement referred to as the least significant bit ("LSB"). For example, DMDs are typically configured to display 256 shades from off (0 LSBs) to all on (256 LSBs) with each shade between 0 and 255 becoming successively brighter. It is possible to create a variety of different color shades by combining various LSBs of red light, green light, and blue light (i.e., primary colors of light). For example, one color shade may be formed from 30 LSBs of red light, 150 LSBs of green light, and 85 LSBs of blue light, another shade from 212 LSBs of red light, 156 LSBs of green light, and 194 LSBs of blue light, and so forth. Because the three colors of light are shined sequentially and rapidly, a viewer sees a single shade of light formed from the three different colors of light.

One technique for generating the sequential stream of colored light is with a color wheel. A color wheel typically includes six color filters arrayed red, green, blue, red, green, blue around the circumference of a wheel. By shining white light at the circumference of the color wheel and rotating the color wheel, it is possible to generate a sequential stream of red, green, and blue light. However, the colored light may become briefly inconsistent when the colored light transitions between primary colors. Due to this variance in color, the light generated during these transitions, which are referred to as spoke times may not be employed.

In certain circumstances, however, a technique known as spoke light recovery ("SLR") maybe employ to use light generated during spoke times. In particular, if the shade of the red light, green light, and blue light components of a pixel are each above a threshold LSB value (e.g., 150) the light generated during the spoke times can be employed. Although SLR can boost the light output for certain shades of light, this boost in light output can create a sudden increase in light output when a video display switches from a non-SLR shade to an SLR shade. Conventional SLR systems compensate for this boost in light output decreasing the non-spoke light by a fixed amount when SLR is employed. However, as light sources age, the amount of light that the light source generates may change, and a fixed compensation cannot adjust for these changes.

An improved method and system for spoke light compensation is desirable.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for compensating for spoke light in a video unit. More specifically, there is provided a method comprising measuring a first light level during a non-spoke time of a color wheel to generate a non-spoke light level; and setting a spoke light compensation value based on the measured non-spoke light level. There is also provided a video unit comprising a light source configured to generate a first light level during a non-spoke time of a color wheel, a photodiode assembly configured to measure the first light level to generate a non-spoke light level, and a processor configured to set a spoke light compensation value based on the non-spoke light level.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
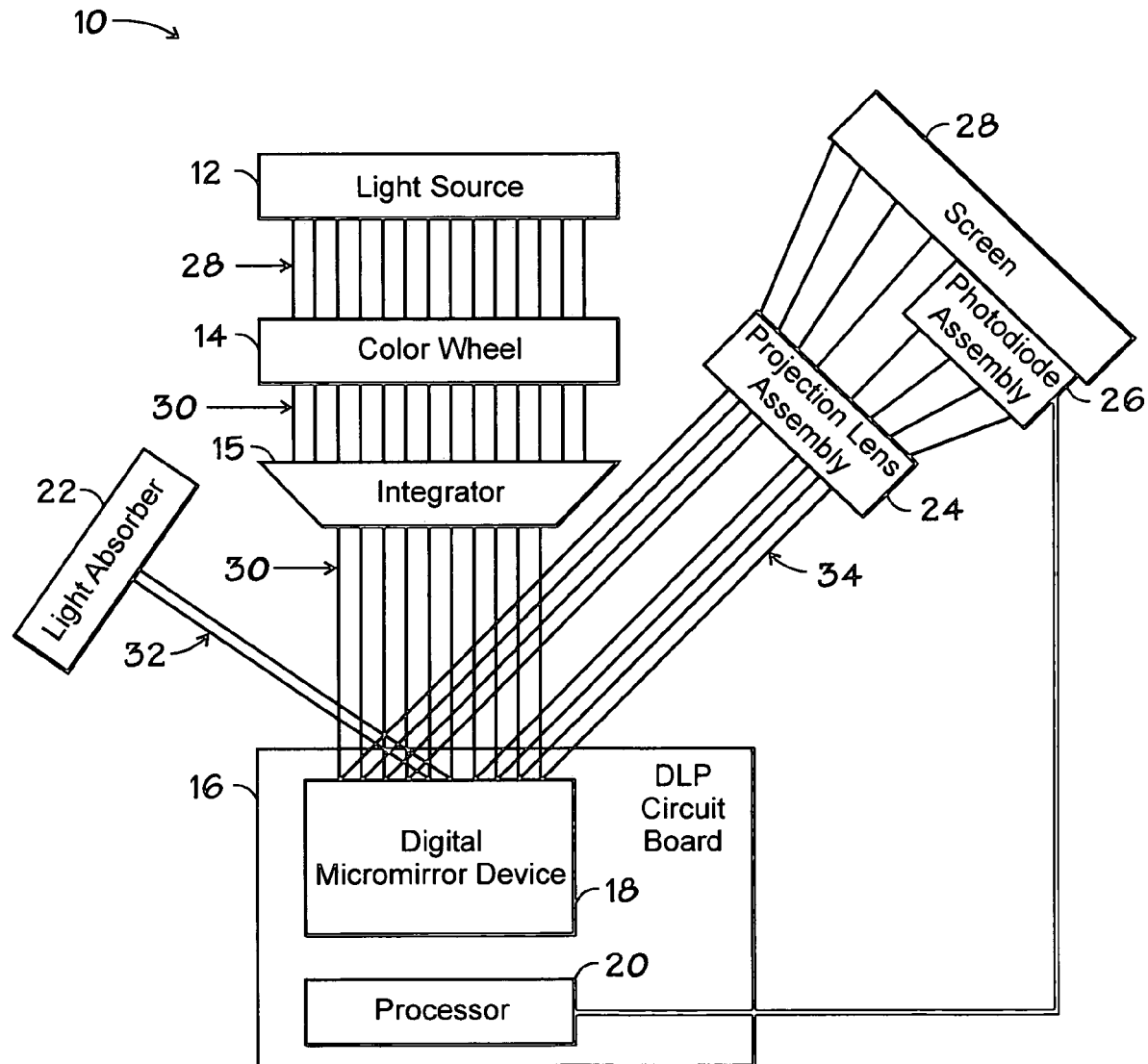
FIG. 1 is a block diagram of a video unit configured to calculate a spoke light compensation value in accordance with embodiments of the present invention.

Turning initially to FIG. 1, a block diagram of a video unit configured to calculate a spoke light compensation value in accordance with embodiments of the present invention is illustrated and generally designated by a reference numeral 10. In one embodiment, the video unit 10 may comprise a Digital Light Processing ("DLP") projection television. In another embodiment, the video unit 10 may comprise a DLP-based video or movie projector. In still another embodiment, the video unit 10 (with modifications) may be a liquid crystal diode ("LCD") projection television or other form of projection display.

The video unit 10 may comprise a light source 12. The light source 12 may comprise any suitable form of lamp or bulb capable of projecting white or generally white light 28. In one embodiment, the light source 12 may include a metal halide, mercury vapor, or ultra high performance ("UHP") lamp. In one embodiment, the light source 12 is configured to project, shine, or focus the white light 28 into one static location as described further below.

Figure 2:
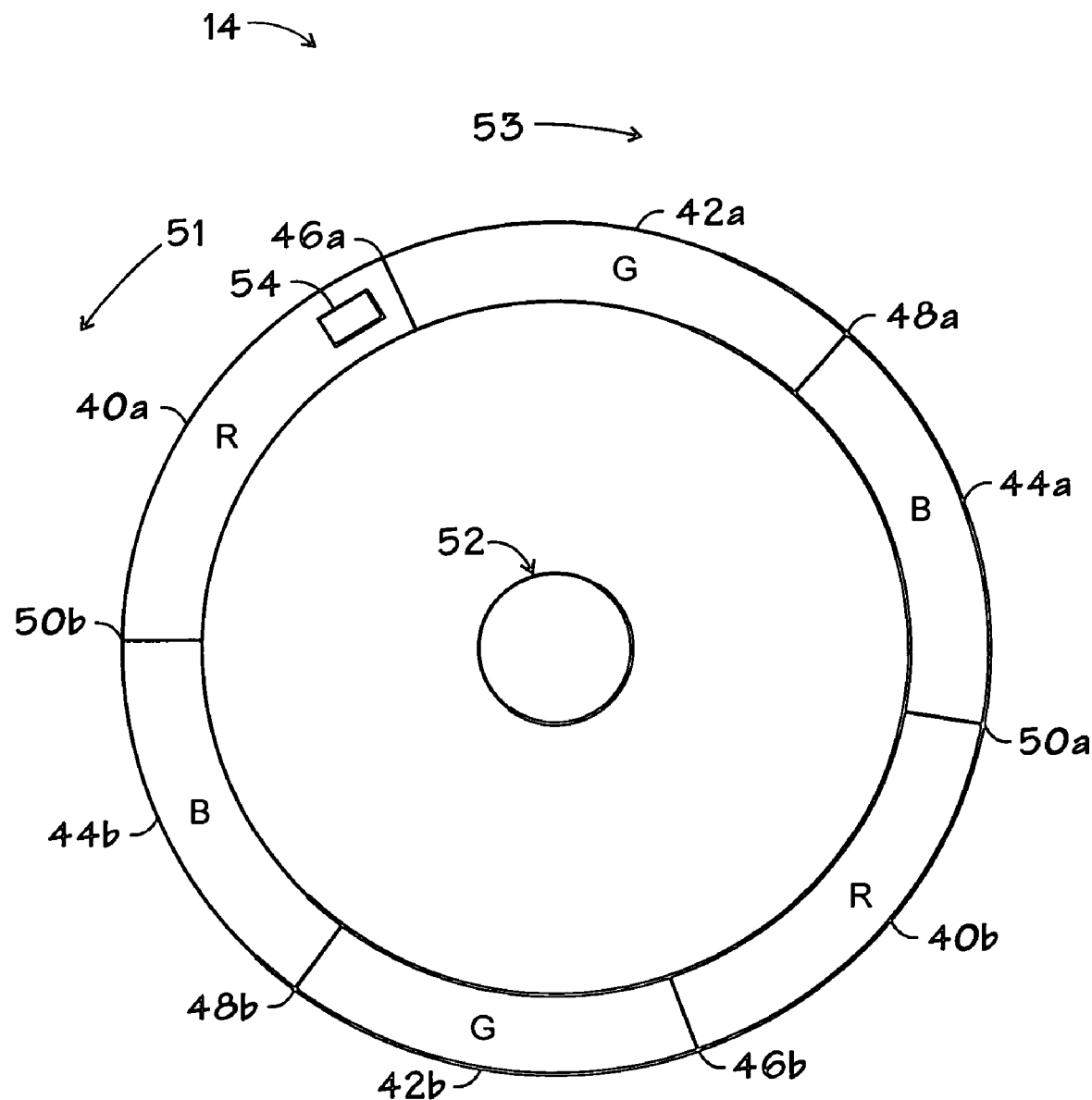
FIG. 2 is a diagram of a color wheel in accordance with embodiments of the present invention.

As illustrated in FIG. 1, the exemplary video unit 10 also comprises a color wheel 14 aligned in an optical line of sight with the light source 12. FIG. 2 is a diagram of the color wheel 14 in accordance with embodiments of the present invention. The color wheel 14 may comprise a variety of color filters 40a, 40b, 42a, 42b, 44a, and 44b arrayed as arcuate regions on the color wheel 14. Specifically, in the illustrated embodiment, the color wheel 14 comprises color filters 40a, 40b, 42a, 42b, 44a, and 44b configured to convert the white light 28 into one of the three primary colors of light: red, green, or blue. In particular, the illustrated embodiment of the color wheel 14 comprises two red color filters 40a and 40b, two green color filters 42a and 42b, and two blue color filters 44a and 44b.

It will be appreciated that in alternate embodiments, the specific colors of the filters 40a, 40a, 42a, 42b, 44a, and 44b may be altered or the number of filters may be altered. For example, in one alternate embodiment, the color wheel 14 may comprise only one red color filter 40a, one green color filter 42b, and one blue color filter 44a. In this embodiment, the arcuate regions occupied by the color filters 44a, 44b, and 44c may be approximately twice as long (as measured along the circumference of the color wheel 14) than the color filters 40a, 42b, and 44a depicted in FIG. 2. In still other embodiments, the color filters 40a, 40b, 42a, 42b, 44a, and 44b may occupy either more or less of the surface area of the color wheel depending on the configuration and function of the video unit 10.

In addition, the color wheel 14 may comprise boundaries between each of the filters 40a, 40b, 42a, 42b, 44a, and 44b. These boundaries are known as spokes 46a, 46b, 48a, 48b, 50a, and 50b due to their resemblance to the spokes of wheel. For example, FIG. 2 illustrates three types of spokes: the yellow (i.e., red-green) spokes 46a and 46b, the cyan (i.e., green-blue) spokes 48a and 48b, and the magenta (i.e., blue-red) spokes 50a and 50b.

Turning next to the operation of the color wheel 14, each of the filters 40a, 40b, 42a, 42b, 44a, and 44b is designed to convert the white light 28 generated by the light source 12 into colored light 30. In particular, the color wheel 14 may be configured to rapidly spin in a counterclockwise direction 51 around its center point 52. In one embodiment, the color wheel 14 rotates 60 times per second. As described above, the light source 12 may be configured to focus the white light 28 at the color wheel 14. On the opposite side of the color wheel from the light source 12, there may be an integrator 15, which is also referred to as a light tunnel. In one embodiment, the integrator 15 is configured to the evenly spread the colored light 30 across the surface of a Digital Micromirror Device ("DMD") 18. As such, those skilled in the art will appreciate that most, and possibly all, of the light that will be reflected off the DMD 18 to create video will pass through the integrator 15.

Because the integrator 15 is fixed and the color wheel 14 rotates, the light that will enter the integrator 15 can be illustrated as a fixed area 54 that rotates around the color wheel 14 in the opposite direction from the color wheel's direction of rotation. For example, as the color wheel 14 rotates in the counterclockwise direction 51, the fixed area 54 rotates through each the filters 40a, 40b, 42a, 42b, 44a, and 44b in the clockwise direction 53. As such, those skilled in the art will recognize that the colored light 30 entering the integrator 15 will rapidly change from red to green to blue to red to green to blue with each rotation of the color wheel 14 as the fixed area 54 passes through each of the color filters 40a, 40b, 42a, 42b, 44a, and 44b. In other words, because the light source 12 is stationary, the counterclockwise rotation of the color wheel 14 causes the fixed area 54 to rotate in a clockwise direction 53 through the colors of the color wheel. In alternate embodiments, the color wheel 14 itself may rotate in the clockwise direction 53. Those skilled in the area will appreciate that the size and shape of the fixed area 54 is merely illustrative. In alternate embodiments, the size and shape of the fixed area 54 may be different depending on the optical design of the system.

However, as the fixed area 54 passes though each of the spokes 46a, 46b, 48a, 48b, 50a, and 50b, the color of the colored light 30 entering the integrator 15 is not consistent. In particular, as the fixed area 54 crosses the edge of one particular spoke 46a, 46b, 48a, 48b, 50a, and 50b, the colored light 30 entering the integrator 15 will comprise two different colors of light. These times (when two different colors of light are entering the integrator 15) are referred to as spoke times. In further example, the percentage of red light will decrease and the percentage of green light will increase as the fixed area 54 moves across the spoke 46a into the green filter 42a until the colored light 30 entering the integrator 15 consists entirely of green light (i.e., the fixed area 54 crosses completely out of the red filter 40a and wholly into the green filter 42a). The color of the colored light 30 will then remain a consistent green color until the fixed area 54 crosses the spoke 48a.

Because the color of the colored light 30 entering the integrator 15 is not consistent during the spoke times, conventional DLP systems may be configured to turn off all of the micromirrors on the DMD 18 during the spoke times. However, the video unit 10 may be configured to utilize a colored light generated during the spoke times in the proper circumstances by employing a spoke light recovery ("SLR") technique. SLR enables the video unit 10 to employ the light generated during the spoke times for a particular pixel if the shade of that particular pixel includes a red, green, and blue light levels that are each above a threshold least significant bit ("LSB") level. In one embodiment, the video unit 10 is configured to employ SLR for a particular pixel if the red, green, and blue light corresponding to that pixel are each greater then or equal to 150 LSBs. Further, to facilitate smoother transitions from non-SLR to SLR and vice versa, the video unit may be configured to subtract some portion of the light generated during the non-spoke times to compensate for the additional light output during the spoke times. This compensation factor is referred to as the spoke light compensation value. As will be described further below with regard to FIGS. 3 and 4, the video unit 10 may be configured to dynamically calibrate its spoke light compensation value.

Returning now to FIG. 1, the video unit 10 may also comprise a digital light processing ("DLP") circuit board 16 arrayed within an optical line of sight of the integrator. The DLP circuit board 16 may comprise the DMD 18 and a processor 20. As described above, the DMD 18 may comprise a multitude of micromirrors mounted on microscopic, electrically-actuated hinges that enable the micromirrors to tilt between a turned on position and turned off position. In the illustrated embodiment, the DMD 18 is also coupled to the processor 20. In one embodiment, the processor 20 may receive a video input and, as described in greater detail below, direct the micromirrors on the DMD 18 to turn on or off, as appropriate to create the video image. In alternate embodiments the processor 20 may be located elsewhere in the video unit 10.

The colored light 30 that reflects off a turned on micromirror (identified by a reference numeral 34) is reflected to a projecting lens assembly 24 and then projected on to a screen 28 for viewing. On the other hand, the colored light that reflects off of a turned off micromirror (identified by a reference numeral 32) is directed somewhere else in the video besides the screen 26, such as a light absorber 22. In this way, the pixel on the screen 26 that corresponds to a turned off micromirror does not receive the projected colored light 30 while the micromirror is turned off.

As illustrated in FIG. 1, the video unit 10 may also include a photodiode assembly 26. In one embodiment, the photodiode assembly 26 may be mounted in the overscan region of the video unit 10. In alternate embodiments, however, the photodiode assembly 26 may be located in other suitable locations within the video unit 10. As illustrated in FIG. 1, the photodiode assembly 26 may be communicatively coupled to the processor 20. As such, in one embodiment described in greater detail below, the processor 20 may be configured to initiate and/or control a spoke light compensation calibration routine (see FIG. 4) and to receive and/or calculate a spoke light compensation value.

Figure 3:
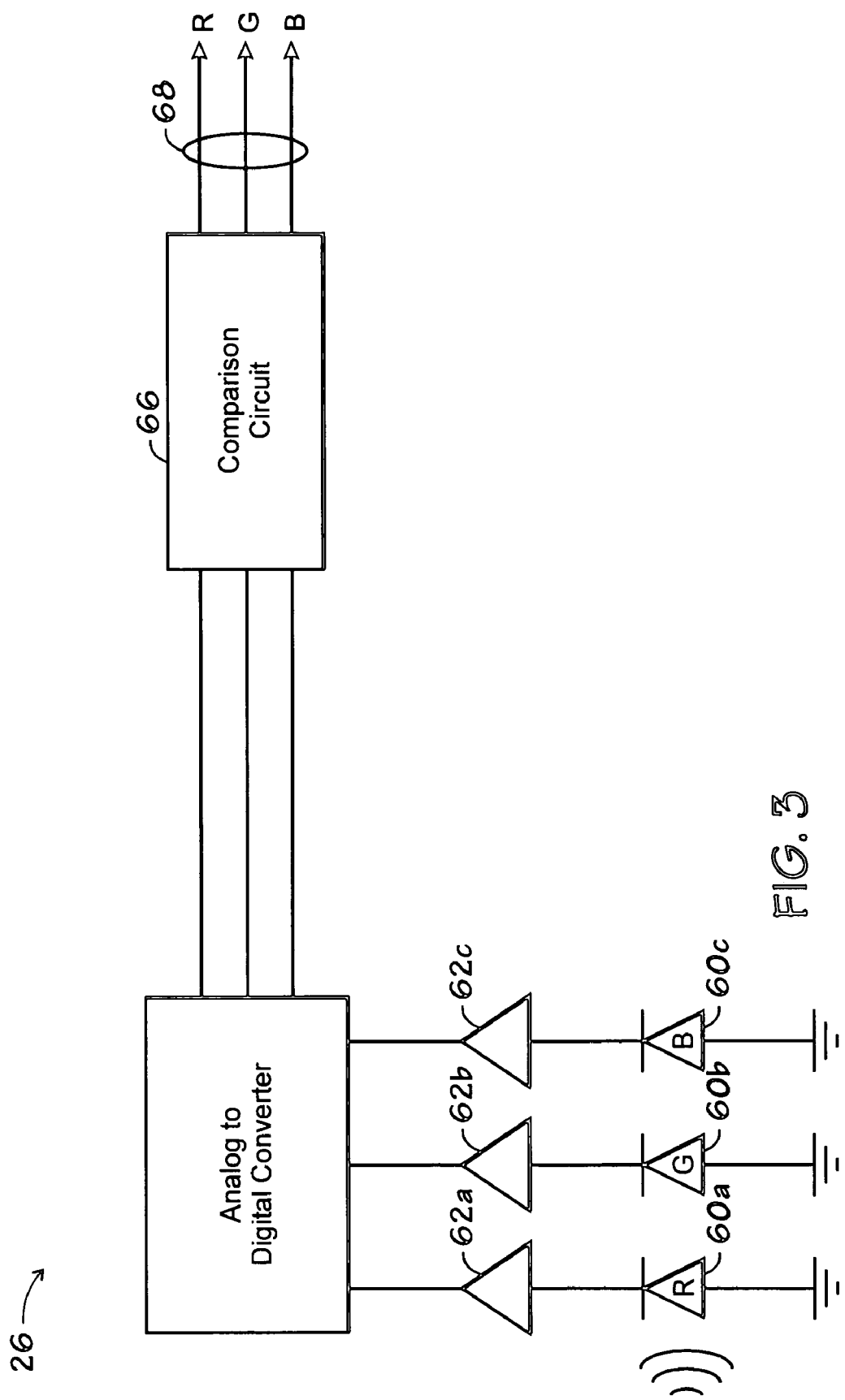
FIG. 3 is a diagram of photodiode assembly configured to calculate a spoke light compensation in accordance with embodiments of the present invention.

FIG. 3 is a diagram of the photodiode assembly 26 in accordance with one embodiment. As will be described further below, the photodiode assembly 26 may be configured to execute a spoke light compensation calibration routine to calculate a spoke light compensation value for the video unit 10 to use when SLR is employed. As illustrated in FIG. 3, the photodiode assembly 26 may include a red photodiode 60*a*, a green photodiode 60*b*, and a red blue photodiode 60*c*. As will be appreciated, the photodiodes 60*a*, *b*, and *c* may be configured to convert received light into a voltage based on the brightness of the light. In particular, the red photodiode 60*a* may be configured to detect red light and to convert the detected red light into a voltage based on the brightness of the detected red light. Similarly, the photodiode 60*b* and 60*c* may be configured to convert detected levels of green light and blue light respectively into voltages.

The voltages produced by the photodiode 60*a*, *b*, and *c* may be transmitted to operational amplifiers 62*a*, 62*b*, and 62*c*, which may amplify the voltages. The amplified voltages can then be transmitted to an analog/digital converter 64, which converts the analog voltages produced by the photodiodes 60*a*, *b*, and *c* and amplified by the operational amplifier 62*a*, *b*, and *c* into digital values. The analog/digital converter 64 may then output the digital values to a comparison circuit 66, which is configured to determine spoke light compensation values 68 for red light, green light, and blue light based on as will be described further below with regard to FIG. 4.

Figure 4:
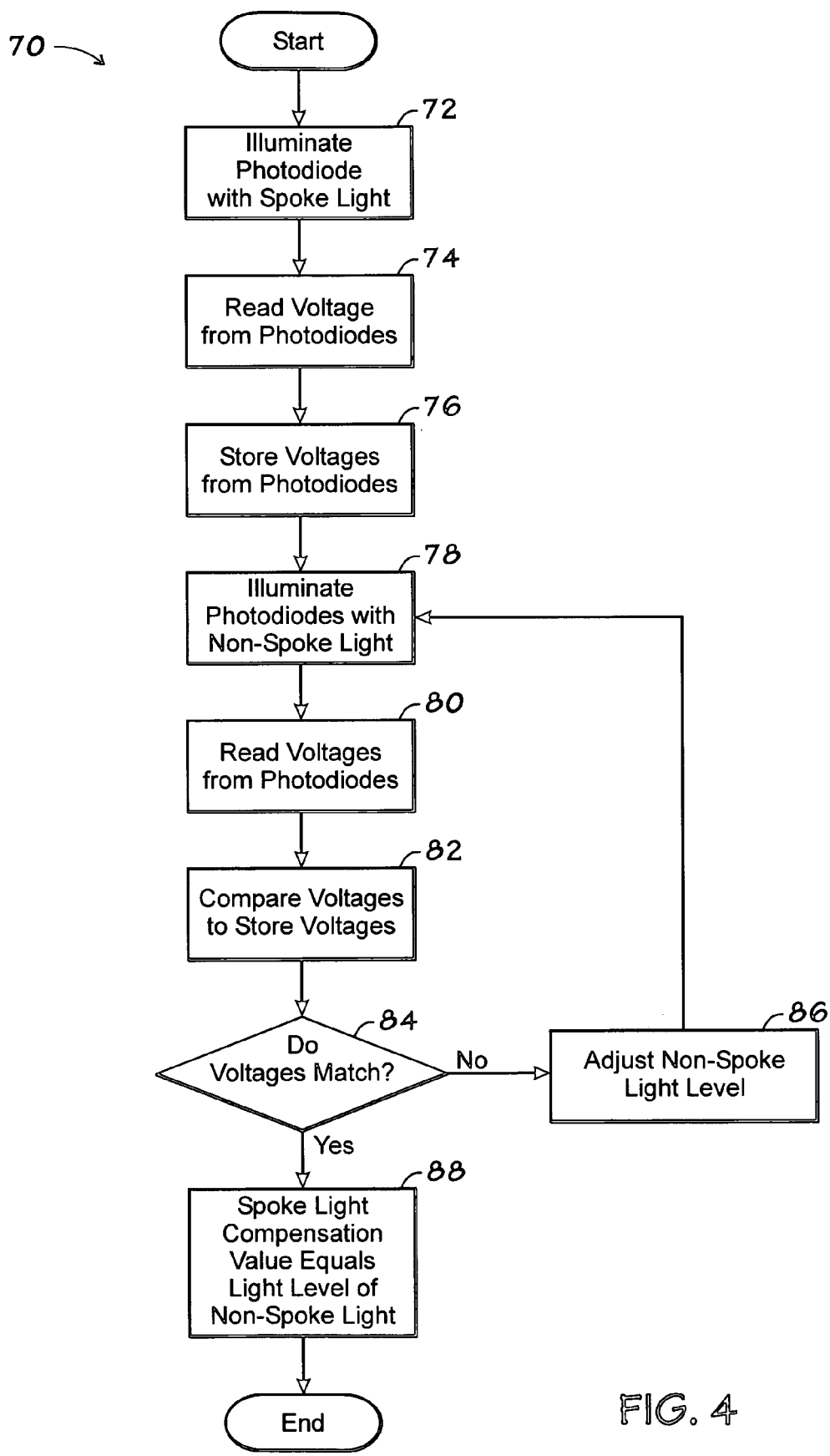
FIG. 4 is a flow chart illustrating an exemplary routine for calculating a spoke light compensation in accordance with embodiments of the present invention.

Turning next to FIG. 4, a flow chart of an exemplary spoke light compensation calibration routine 70 in accordance with one embodiment is illustrated. In one embodiment, the routine 70 may be performed by the video unit 10. As illustrated in FIG. 4, the routine 70 may begin by illuminating the photodiode assembly with red, green, and blue spoke light, as illustrated in block 72. Next, the photodiode assembly 26 may read voltages from the photodiodes corresponding to the brightness of the red, green, and blue spoke light, as indicated in block 74. Once read, the video unit 10 may store the voltages corresponding the spoke light from the photodiodes in a memory located within the photodiode assembly 26, on the DLP circuit board 16, or in another suitable location within the video unit 10, as indicated in block 76.

The video unit 10 may also illuminate the photodiodes within the photodiode assembly 26 using non-spoke light, as indicated by block 78. As the photodiodes in the photodiode assembly 26 are illuminated, the photodiode assembly 26 may read the corresponding voltages from the photodiodes 60*a*, 60*b*, and 60*c*, as indicated in block 80. Next, the comparison circuit 66 may compare the voltages corresponding to the non-spoke light to the stored voltages of the spoke light, as indicated in block 82.

If the voltages corresponding to the non-spoke light do not match the stored voltages corresponding to the spoke light (block 84), the video unit 10 may adjust the non-spoke light level and repeat blocks 78-84 until the voltage corresponding to the non-spoke light matches the stored voltage from the spoke light to within a margin of error, as indicated in block 86. For example, if the non-spoke light voltage was greater than the spoke light voltage, the video unit 10 may decrease the spoke light level (i.e., decrease the non-spoke LSBs). Similarly, if the spoke light voltage is greater than the non-spoke light voltage, the video unit 10 may increase the non-spoke LSBs to increase the amount of non-spoke light.

Once the two voltages match, the video unit 10 may set the spoke light compensation value equal to the light level (e.g., the LSBs) of the non-spoke light, as indicated in block 88. Once set, the spoke light compensation value can be employed when the video unit 10 uses SLR.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method comprising:
   measuring a first light level during a non-spoke time of a color wheel to generate a non-spoke light level; and
   setting a spoke light compensation value only during a non-spoke time based on the measured non-spoke light level.

2. The method of claim 1, comprising:
illuminating a photodiode with light during the non-spoke time of the color wheel.

3. The method of claim 1, comprising:
measuring a second light level during a spoke time of the color wheel to generate a spoke light level, wherein setting the spoke light compensation value comprises setting the spoke light compensation value based on the measured spoke light level.

4. The method of claim 3, wherein setting the spoke light compensation value comprises adjusting the measured non-spoke light level to approximately match the measured spoke light level.

5. The method of claim 1, comprising illuminating a red photodiode, a green photodiode, and a blue photodiode, wherein setting the spoke light compensation value comprises setting a red spoke light compensation value, a green spoke light compensation value, and a blue spoke light compensation value.

6. The method of claim 1, comprising reducing light generated during a non-spoke time of the color wheel based on the spoke light compensation value.

7. The method of claim 1, wherein measuring a first light level comprises measuring a voltage generated by a photodiode during the non-spoke time.

8. The method of claim 1, comprising reducing the brightness of an image projected onto a screen based on the spoke light compensation value.

9. A video unit comprising:
a light source configured to generate a first light level during a non-spoke time of a color wheel;
a photodiode assembly configured to measure the first light level to generate a non-spoke light level; and
a processor configured to set a spoke light compensation value only during a non-spoke time based on the non-spoke light level.

10. The video unit of claim 9, wherein the photodiode assembly comprises a photodiode.

11. The video unit of claim 9, wherein the photodiode assembly is configured to measure a second light level during a spoke time of the color wheel to generate a spoke light level and wherein the processor is configured to set the spoke light compensation value based on the measured spoke light level.

12. The video unit of claim 11, wherein the processor is configured to adjust the measured non-spoke light level to approximately match the measured spoke light level.

13. The video unit of claim 9, wherein the photodiode assembly comprises a red photodiode, a green photodiode, and a blue photodiode.

14. The video unit of claim 9, comprising a digital micromirror device configured to reflect the first light level.

15. The video unit of claim 14, wherein the digital micromirror device is configured:
to reduce the brightness of the first light level; and
to project the reduced first light level on to a screen.

16. A video unit comprising:
means for measuring a first light level during a non-spoke time of a color wheel to generate a non-spoke light level; and
means for setting a spoke light compensation value only during a non-spoke time based on the measured non-spoke light level.

17. The video unit of claim 16, comprising:
means for measuring a second light level during a spoke time of the color wheel to generate a spoke light level, wherein setting the spoke light compensation value comprises setting the spoke light compensation value based on the measured spoke light level.

18. The video unit of claim 17, comprising means for adjusting the measured non-spoke light level to approximately match the measured spoke light level.

19. The video unit of claim 16, comprising means for illuminating a red photodiode, a green photodiode, and a blue photodiode, wherein setting the spoke light compensation value comprises setting a red spoke light compensation value, a green spoke light compensation value, and a blue spoke light compensation value.

20. The video unit of claim 16, wherein the means for measuring a first light level comprises means for measuring a voltage generated by a photodiode during the non-spoke time.

* * * * *